United States Patent
Hagstrom et al.

(10) Patent No.: US 6,447,181 B1
(45) Date of Patent: *Sep. 10, 2002

(54) VARIABLE POSITION, FORCE AND VELOCITY PRINTER

(75) Inventors: Erick Hagstrom, Medina; Michael R. Tolrud, Chaska, both of MN (US)

(73) Assignee: Primera Technology, Inc., Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/522,891

(22) Filed: Mar. 10, 2000

Related U.S. Application Data (63) Continuation-in-part of application No. 09/349,327, filed on Jul. 8, 1999, now abandoned, which is a continuation-in-part of application No. 09/326,041, filed on Jun. 4, 1999, now Pat. No. 6,148,722.
(60) Provisional application No. 60/092,305, filed on Jul. 9, 1998, and provisional application No. 60/088,397, filed on Jun. 8, 1998.

(51) Int. Cl.[7] .............................. B41J 2/315; B41F 17/00
(52) U.S. Cl. ................... 400/120.01; 400/208; 101/35; 101/486; 347/193
(58) Field of Search .................... 400/120.01, 120.07, 400/208, 54, 58, 61, 682; 101/35, 4, 36, 37, 44, 484, 486, 188; 347/193, 171, 197

(56) References Cited

U.S. PATENT DOCUMENTS

| | | | |
|---|---|---|---|
| 4,943,814 A | 7/1990 | Otto ........................... 346/1.1 |
| 5,020,926 A | 6/1991 | Wilhelm ...................... 400/54 |
| 5,078,518 A | 1/1992 | Ono et al. ................... 400/103 |
| 5,117,241 A | 5/1992 | Stephenson ................. 346/1.1 |
| 5,316,396 A | 5/1994 | Imai ............................. 400/56 |
| 5,317,337 A | 5/1994 | Ewaldt ....................... 346/1.1 |
| 5,319,392 A | 6/1994 | Durst et al. ............. 346/76 PH |
| 5,326,179 A | 7/1994 | Fukai et al. ................ 400/120 |
| 5,355,357 A | 10/1994 | Yamamori et al. ......... 369/75.2 |
| 5,369,422 A | 11/1994 | Yoshida et al. ............. 347/215 |
| 5,374,944 A | 12/1994 | Janosky et al. ......... 346/76 PH |
| 5,427,029 A | 6/1995 | Dumke ....................... 101/484 |
| 5,488,223 A | 1/1996 | Austin et al. ............... 347/193 |
| 5,504,688 A | 4/1996 | Letourneau ................. 364/478 |
| 5,518,325 A | 5/1996 | Kahl ............................ 400/70 |
| 5,709,488 A | 1/1998 | Imai et al. .................. 400/234 |
| 5,771,797 A | 6/1998 | Dubuit ......................... 101/37 |
| 5,815,191 A | 9/1998 | Michielsen et al. ......... 347/188 |
| 5,915,858 A | * 6/1999 | Wen ............................ 101/35 |
| 5,927,208 A | * 7/1999 | Hagstrom et al. ............ 101/35 |
| 6,000,329 A | 12/1999 | Averill ........................ 101/35 |
| 6,017,159 A | 1/2000 | Tse ............................. 400/208 |
| 6,019,526 A | 2/2000 | Herbert ....................... 400/58 |

FOREIGN PATENT DOCUMENTS

| | | |
|---|---|---|
| DE | 197 50 570 A1 | 5/1998 |
| EP | 0 297 668 A2 | 1/1989 |
| EP | 0 422 927 | 4/1991 |
| EP | 0 430 565 A2 | 6/1991 |
| EP | 0 799 710 A1 | 10/1997 |
| FR | 2 712 102 | 1/1994 |
| GB | f2 320 912 | 7/1998 |
| JP | 55 164 180 | 12/1980 |
| JP | 62 080 075 | 4/1997 |
| JP | 10 157 176 | 6/1998 |

* cited by examiner

*Primary Examiner*—Eugene Eickholt
(74) *Attorney, Agent, or Firm*—Westman, Champlin & Kelly, P.A.

(57) ABSTRACT

A printer for printing onto substrates includes a housing that mounts a movable carrier for the substrates such as a compact disc or digital versatile disc. The carrier for the substrate is driven relative to the printhead while printing takes place, and a platen is provided to urge the substrate toward the printhead for printing and to a position to space the substrate from the printhead when raised surface areas of the substrate underlie the printhead. The force applied by the platen can be varied as a function of the position of the substrate as well, in addition the carrier can be driven at a variable speed selected as a function of the length of the line being printed.

22 Claims, 8 Drawing Sheets

VARIABLE POSITION, FORCE AND VELOCITY PRINTER

CROSS REFERENCE TO RELATED APPLICATION

This Application claim benefit to Provisional Application No. 60/088,397 Jun. 8, 1998.

The present application is a continuation-in-part of now abandoned U.S. patent application Ser. No. 09/349,327, filed Jul. 8, 1999 for VARIABLE VELOCITY COMPACT DISC PRINTER, which claimed priority to Provisional Application Serial No. 60/092,305, filed Jul. 9, 1998, and entitled THERMAL CD-R PRINTER WITH REMOVABLE PRINTHEAD and which was a continuation-in-part of U.S. application Ser. No. 09/326,041 now U.S. Pat. No. 6,148,722, filed Jun. 4 1999 for COMPACT DISC AND RECORDABLE COMPACT DISC THERMAL TRANSFER PRINTER, all incorporated herein by reference.

BACKGROUND OF THE INVENTION

The present invention relates to a thermal transfer printer that will transfer an imaging compound, such as a wax, wax resin or wax resin composite, or a dye from a carrier ribbon, film or web to a substrate, as shown, a disc shaped substrate such as a compact disc (CD) or digital versatile disc (DVD) using linear printing across transverse (chordal) lines on the circular disc, which vary in length as the disc progresses underneath the thermal printhead. The velocity of movement of the compact disc is varied along with a platen position and engagement force to efficiently use available power so as to compensate for the changing power required by the printhead for printing differing print line lengths and also space the printhead from raised rims around the central opening of DVD'S.

Thermal printing technology for CDs and DVDs and recordable compact discs (CD-Rs) incorporate pivotally mounted heads and linear platens with resilient surfaces and expensive clamping mechanisms for the disc. Loading thermal ink ribbons is cumbersome, inconvenient and time-consuming because the ribbon must be threaded through the rollers and the printhead and manually re-attached to a take-up core.

Current technology for printing onto CDs utilizes expensive head actuating and force modifying mechanisms. The printhead is moved on pivotally mounted arms that extend substantially beyond the envelope of the printhead, with a linearly driven carriage that has to hold the disc over a flat resilient surface with a clamping device that moves with the carriage. Threading the ribbon through the printhead and mounting ports of the presently available printers is a tedious job which includes taping the ribbon to the carriage, then taping the ribbon after the carriage is driven into the printer. This leads to large, high-cost thermal transfer CD, CD-R and DVD printers. It is desirable to substantially reduce the size in order to take less space for the CD printers, as well as manufacturing costs and user interaction.

The invention described herein is a thermal transfer printer utilizing numerous cost-saving and space saving design features that will improve the technology and give the printer the potential to be used in a typical computer drive bay.

Conventional techniques for thermal printing onto circular objects, such as a CD disc, cause the circular object to be printed to pass beneath a thermally activated printhead at a uniform rate of speed. The present invention varies the speed at which the circular object passes beneath the printhead to manage the power needed for the printing process and varies the force on and position of the disc as a function of the position of the disc under the printhead. This permits the printer to utilize a non-dedicated and limited power source, such as a personal computer power supply and also to reliably print on DVDs which have a raised rim around the center portion of the disc.

SUMMARY OF THE INVENTION

The present invention relates to a thermal transfer printer utilizing a printhead cartridge that mounts into a frame and prints on CDs, CD-Rs and DVDs reliably. The printhead is mounted so that when it is in place on the printer frame, it does not move relative to the frame. A platen roller is mounted so that it and a carrier for the disc can be moved against the printhead under a spring force that is controlled externally. The force is preferably varied as a function of disc position, taking into account the length of the print line being printed, also, the platen can be moved to cause the disc to be spaced from the printhead to clear irregularities on the disc surface, such as the raised rim ring that is present at the center portion of the DVDs.

In one form shown, a schematic representation is made for a spring loading of the platen, and also in a more detailed form, the platen is mounted onto a pivoting frame having side arms that are supported on a pivot. The frame mounts not only the platen, but also additional drive rollers for the substrate or disc carrier. The force with which the platen, carrier and substrate are urged against the printhead during the printing operation can be selected to be at a desired level, and can be changed by a cam that acts on a cam follower connected to the platen frame by springs so that the frame pivots toward the printhead under spring load. The platen is resilient to provide some cushioning load of the cartridge and the substrate, (CD or CD-R for example) against the printhead, which is held in a fixed position. The force applied by the spring to the platen is changed by changing the position of the cam. This cam position is correlated to the position of the disc under the platen, so the force can be varied as a function of print length. Also, if the substrate has irregularities (whether a disc or a rectilinear card) the platen can be dropped so the printhead clears the irregularities and then returns to printing after the irregularities or raised portion passes by.

The drive motor for the platen and any other drive motors used to move the substrate or disc is varied in speed, to vary the velocity of movement of the disc as a function of the disc position relative to the print line of the printhead. The speed change is relative to the length of the line actually being printed at any position of the disc. Alternatively, the speed can change relative to the length of the potential print line, even if the entire line is not printed upon. The change in speed can be correlated with a change in cam position for changing the force on the printhead at the same time and dropping the platen and substrate for clearing a DVD raised rim or other known irregularity.

The power required by the thermal printhead is proportional to the number of heat resistors energized on the length of the print line. When the print line is shorter, more power is available to the disc drive system which, as a result, can be driven faster. A stepper motor drives the disc and its support past the printhead at a speed which varies as the printed substrate (typically a CD, DVD or CD-R) moves past the printhead. By varying the speed of the substrate, an elegant solution is provided to the problem of maximizing print speed within the constraints of the limited power supply within a personal computer. Since the invention is engineered to fit within a standard slot within a personal computer, or other devices with limited power it must share the power supply provided by the personal computer with the other functions within the personal computer requiring power. The most efficient methodology to provide high print speed and low demand on the power is to move the disc and its carrier as quickly as is possible without impacting print quality. When the disc carrier is originally moved into contact with the printhead, the print line is short. The print line length increases until a position near the diameter of the substrate is reached (the disc has a center hole) then the length of the print line decreases until it reaches a local minimum at the center. The second half of the disc is symmetrical with respect to the center. The speed varies inversely to the print line length. After starting at 0, the speed quickly reaches a maximum near the edge of the disc. The speed is then reduced to a minimum at the point where the print line is longest. Then the speed is increased until it reaches a local maximum in the center. There is compensation for the presence of a center hole which is standard for holding such discs and the force from the platen can be reduced in the center portion. The platen can be lowered in center portions to clear the rim on a DVD, and speed increased as that portion of a DVD moves under the printhead.

DETAILED DESCRIPTION OF THE ILLUSTRATIVE EMBODIMENTS

Figure 1:
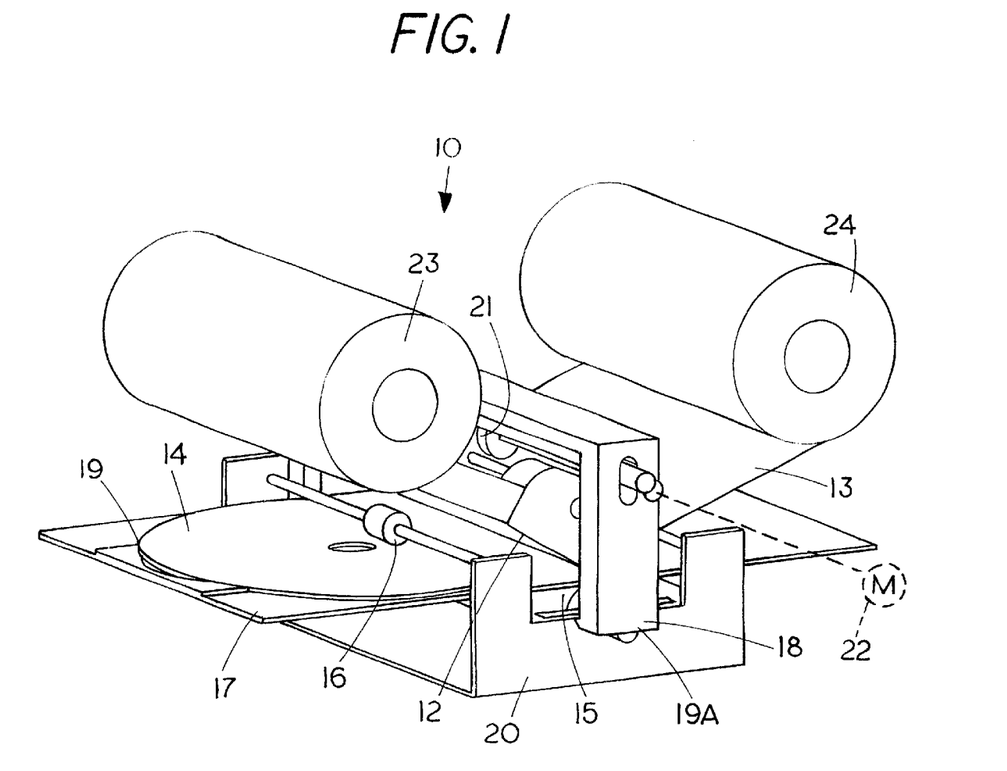
FIG. 1 is a schematic representation of one form of the present invention.
Figure 2:
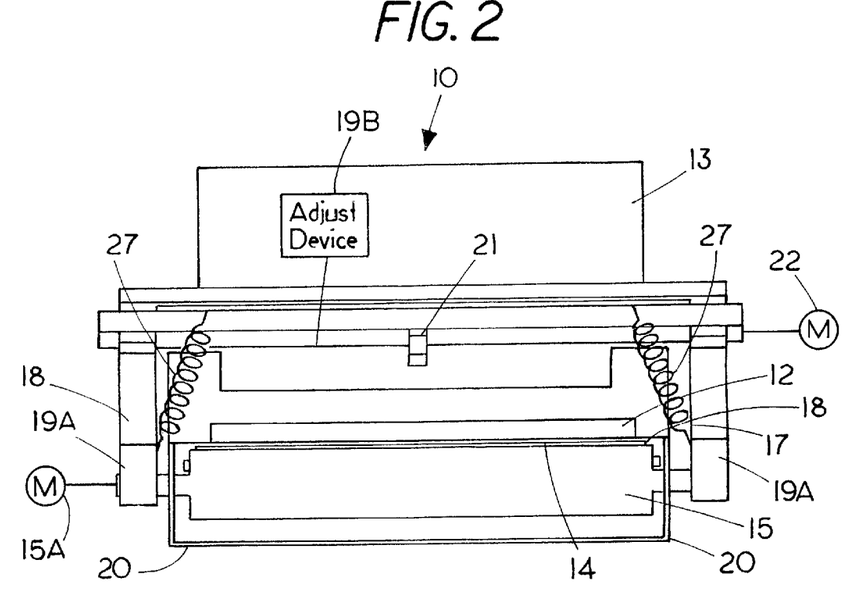
FIG. 2 is a front view of the form of the invention shown in FIG. 1.
Figure 3:
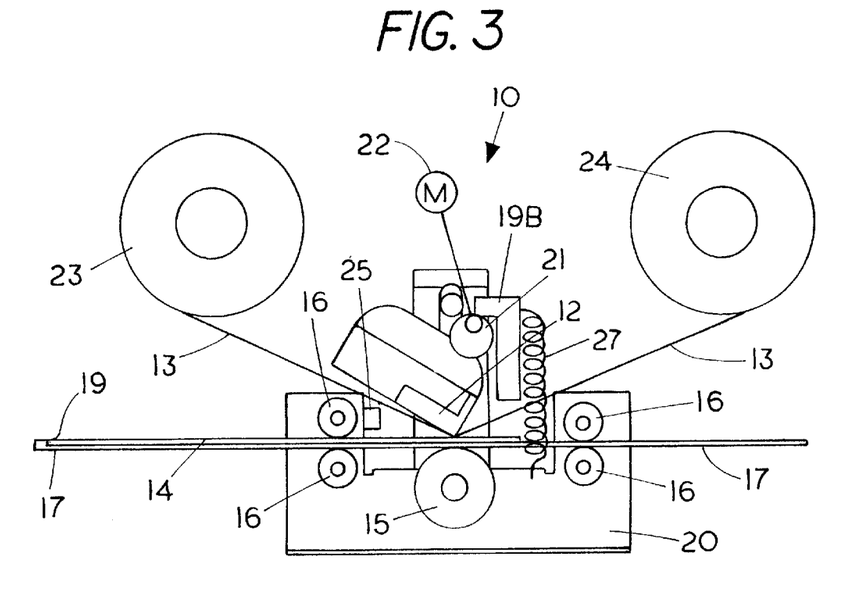
FIG. 3 is a schematic side-elevational view of the device of FIG. 1, again schematically illustrated.

FIGS. 1 through 3 show a schematic view of a printer 10 embodying the principles of the present invention and include a printhead 12 that has a series of very small heat elements (resistors) that transfer a base coating or an imaging compound, wax, resin or resin composites or sublimation dyes from a carrier ribbon, film or web 13, to a substrate 14, which is typically, but not always, a circular compact disc or recordable compact disc. The platen 15 in this form is used to force the substrate 14 against the ribbon 13 and create intimate contact between the printhead, ribbon and substrate. The substrate is carried on a support or carrier 17, and the platen 15 will be controlled to push the carrier 17 up against the substrate and move it in its path and then in turn, push the substrate against the ribbon and the printhead 12 for printing images.

Images are created through control of individual heat elements on the length of the thermal transfer printhead to selectively apply the imaging compound to specific areas of the substrate. Colors can optionally be created with multiple passes using a panelled ribbon, combined with dithering techniques to create several perceived colors, as is known.

The speed of platen roller 15, which is driven by a stepper motor 15A is controlled and varied as it is held against the printhead 12 under a spring load. The carrier 17 is rigid enough so that it can support the weight of the CD when it is fully extended out from the printer, as will be shown in subsequent drawings, in a position linearly horizontal to the plane of the support and disc as the disc is being printed, and yet will have some "give" as the platen roller 15 urges the carrier 17 and the disc 14 on the carrier against the printhead. The speed control is carried out with a program and the variation in speed is a function of the length of line being printed and thus a function of the number of heaters energized. The longer the line of print, the more heaters or resistors in the printhead are powered which requires more power. For conservation of power, the power to the stepper motor or motors driving the carrier is reduced, so the speed of movement of the disc is also reduced. The printer generally is driven from a personal computer power supply.

Brackets 18 are used for mounting the platen relative to the printhead as shown schematically, and the brackets can be released so platen roller 15 can be moved down, so that a frame that contains the printhead and ribbon can be removed from the printer easily.

Springs shown schematically at 27 in FIG. 2, as will be explained in the exemplary form of the invention are used to load the platen against the carrier or support 17. The platen roller is mounted so it is held against the carrier or support 17 in a floating manner without a pivotally mounted frame such as by providing a frame with slots for guiding the carrier. The roller is clamped to the printhead frame through intermediate brackets 18 and 19A which can be unclamped and allow the platen roller to drop away from the printhead. By unclamping and moving the platen roller out of the way, the ribbon can be installed in a straightforward fashion.

The clamping brackets 18 and 19A can be spring loaded to hold the platen against the carrier with springs 27 actuated by a cam. The disc and membrane or carrier are held by pinch rollers 16 which locate the disc on the membrane by forcing it up against a reference edge 19 of the carrier when being engaged and they serve to hold the disc in a controlled, known position throughout the printing process.

The chassis of the printer has a moveable portion 20 that allows the platen roller 15 to move vertically while maintaining the fixed horizontal position of the platen roller. The vertical movement is controlled by a camshaft 21 mounted through the top portion of the chassis (which is fixed and non-moveable). The camshaft 21 is drive by a stepper motor 22 and springs 27 are attached to a bracket 19B which is driven by the camshaft on one end and pivotally attached to the moveable portion 20 of the chassis on the other so it tilts. By incrementally moving the camshaft 21 by actuating the stepper motor, 22, the roller 15 can be raised or lowered under spring force, thus creating the pressure upon the membrane or carrier 17. This allows the platen roller 15 to act as a pinch roller in the sense that as it is raised, it pinches the membrane or carrier and the CD between itself, the printhead and the ribbon. The position of and force provided by the platen can be changed as a function of disc position.

The print ribbon 13 is mounted on a supply roller 23, and there is a take-up roller 24 which will be moved with the same cartridge as the printhead, so that the print supply and take-up rollers can be easily installed, without the need for threading the film or ribbon through particular rollers or slots.

The motor 15A is varied in speed as a function of the position of the disc (CD) relative to the printhead. A sensor 25 will sense the leading edge of the CD and provide input to a controller, as will be explained, to start the motor 15, and drive it at a rate of speed commensurate with a short print line. The speed decreases as the print lines get longer, and increases as the print lines again get shorter. Stepper motor 15A can be controlled precisely and can be used to drive rollers 16, as well, through gears or timing belts. The cam motor 22 can be simultaneously controlled as a function of position of the disc or substrate.

Figure 4:
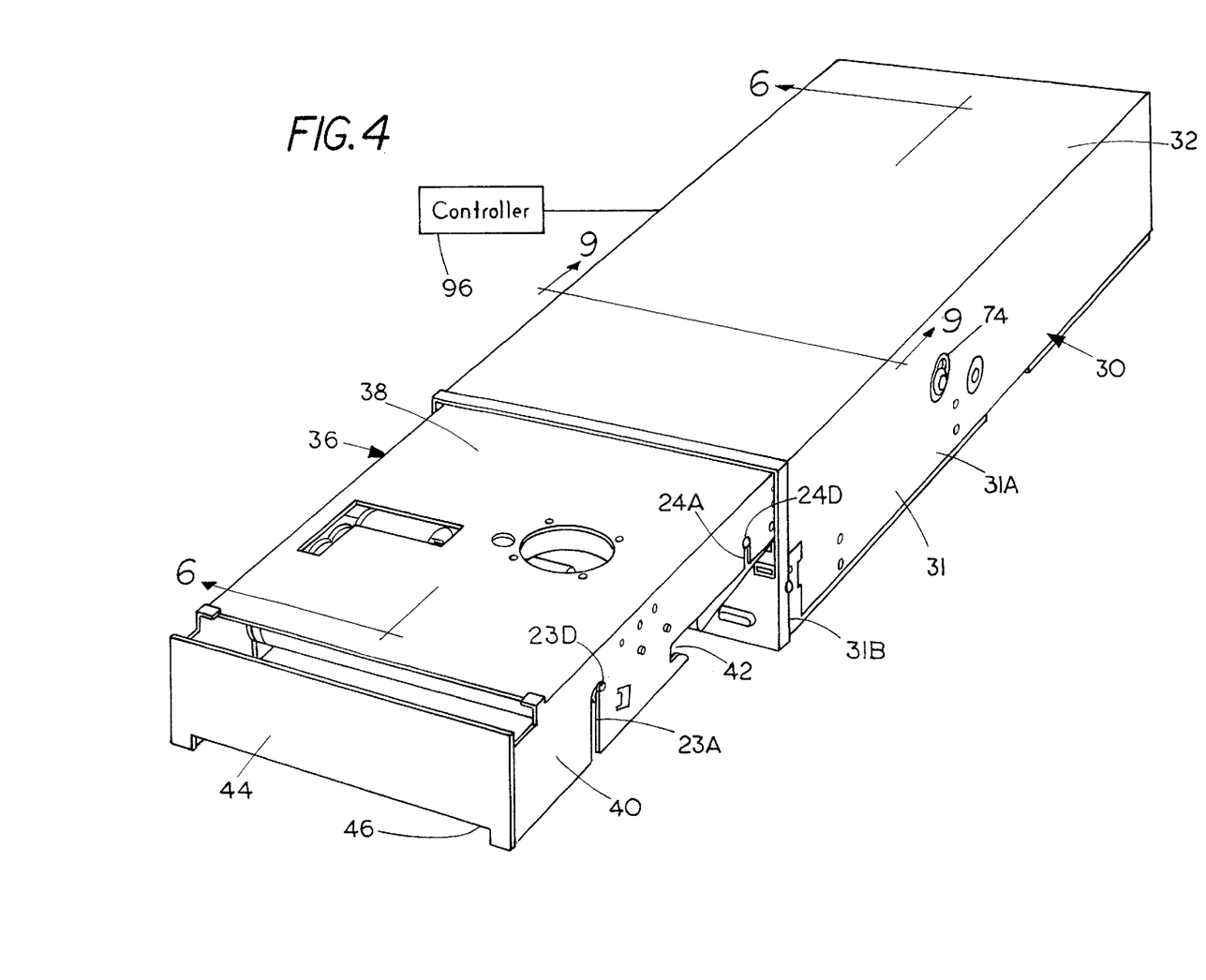
FIG. 4 is a perspective view of a housing or cabinet showing a printhead cartridge on which the printhead is located about to be inserted into the cabinet.

In FIGS. 4 through 13, an illustrative embodiment is illustrated and explained. Referring first to FIG. 4, a main cabinet 30 forms a housing that has side walls 31, and a top wall 32 as well as a bottom wall 34, (see FIG. 6, and other Figures for example). A printhead cartridge assembly 36 that is a unitary assembly has a top wall 38, and depending side walls 40. The side walls 40 are made to fit between the side walls 31 of the main housing, and it can be seen that the side walls 40 include a latch recess 42 on each side that will be used for holding the cartridge assembly 36 in position when it is fully inserted into the housing 30. Suitable supports are used to support the printhead cartridge 36 in proper position.

The printhead cartridge 36 has a front wall 44 that includes a recess 46 (FIG. 4) that will permit the CD support or carrier 17 and disc (CD, CD-R or DVD as shown) 14 to be on the exterior of the housing for loading, and then driven into the housing 30 for printing.

Figure 5:
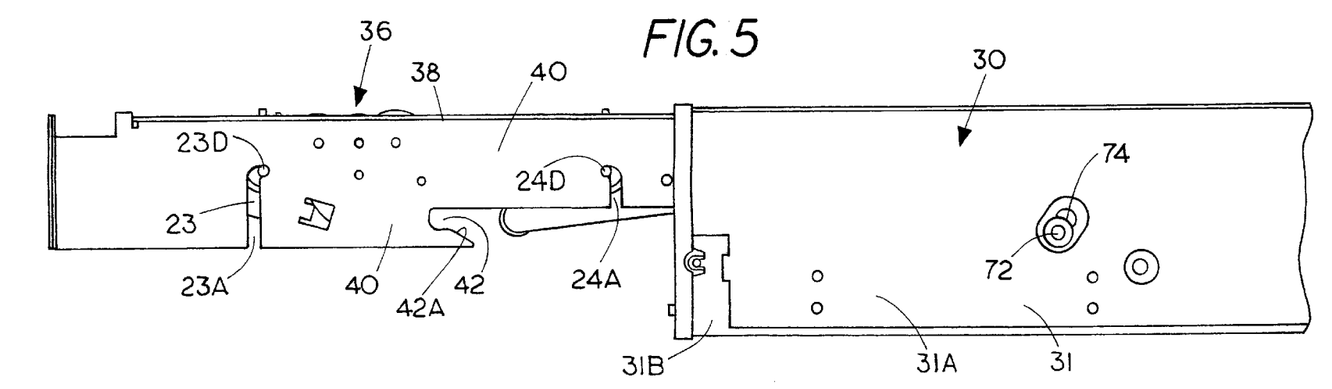
FIG. 5 is a side elevational view of the form of the cabinet shown in FIG. 4.

The supply roll 23 for the ribbon film or web 13 and the take-up roll 24 for the ribbon, film or web are mounted onto the side walls of the printhead cartridge. The slots 23A and 24A shown in FIGS. 4 and 5 mount shafts for these supply and take-up rollers and hold them in off-set notches. The thermal printhead 12 is mounted to the side walls 40 of the cartridge assembly 36, and is fixed in position. A suitable sensor 12A (FIG. 7) can be used for sensing the ribbon 13 for various controls. A motor 23B can be used for driving the supply roll 23. The take-up roll 24 will be driven from a motor 24B through a gear train 24C that will match up when the printhead cartridge assembly is in position in the housing 30.

A spring loaded pinch roller 48 is mounted on the printhead cartridge assembly 36, and will cooperate with drive rollers, as will be explained, for driving the carrier 17 and the disc 14 under the printhead 12 for printing.

Figure 6:
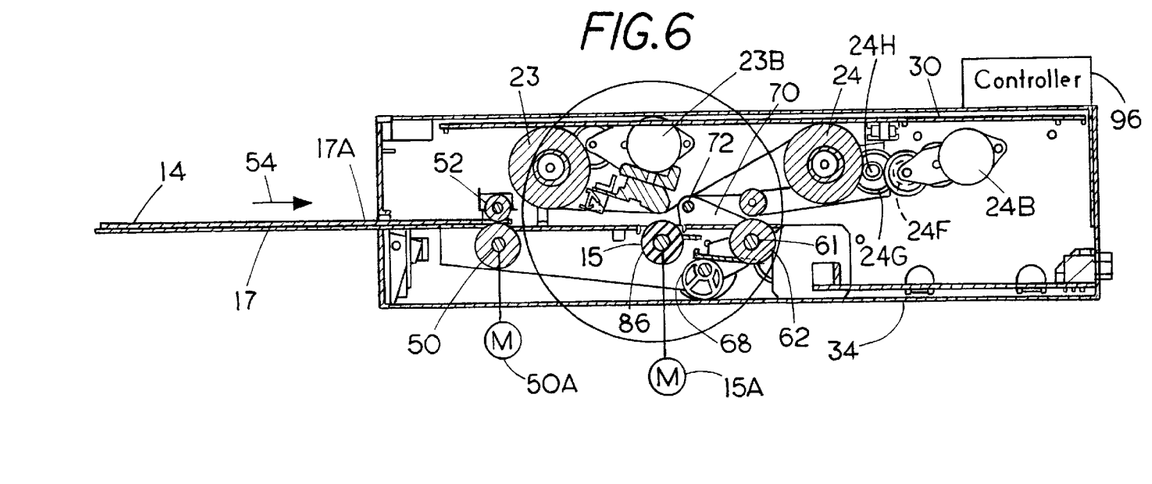
FIG. 6 is a horizontal sectional view of the device shown in FIG. 5 taken generally along line 6—6 in FIG. 4 with the printhead fully in place and the cartridge carrying a substrate to be printed on the exterior of the main cabinet.

In FIG. 6, the carrier 17 is in a loading position for receiving a disc 14 and the carrier 17 is mounted for movement on a drive roller 50 at an input end of the housing that cooperates with a spring loaded pinch roller 52 to engage the carrier 17 and drive it in direction as indicated by the arrow 54. A platen support frame 56 has a top plate 60 and a pair of side walls or arms 58 to form an inverted channel (See FIGS. 7, 8 and 9). The carrier 17 moves over the top plate 60 which is supported on the arms 58 that are pivotally mounted on the axis of a shaft 61 of a drive roller 62. The arms and top plate 60 extend toward the input end of the housing 30.

The platen support top plate 60 joins the side arms or walls 58. The drive rollers and platen roller carry and drive the carrier 17 and disc 14 into printing position. The shaft 61 and roller 62 are suitably driven with stepper motor 61A, and will drive the carrier 17 as printing progresses. The drive roller 62 will cooperate with the pinch roller 48 on the printhead cartridge for providing a driving force when the printing has commenced, and the carrier 17 is being moved in direction indicated by arrow 54 perpendicular to the print line of the printhead. On this form three rollers drive the carrier 17 and must be controlled.

Figure 7:
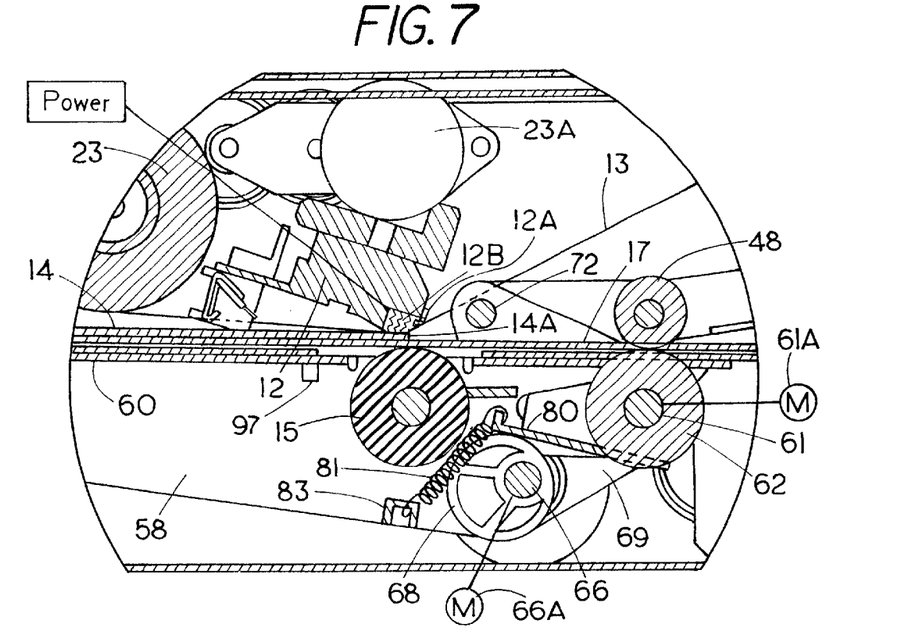
FIG. 7 is an enlarged sectional view of the portion circled in FIG. 6 with printing about to commence.
Figure 9:
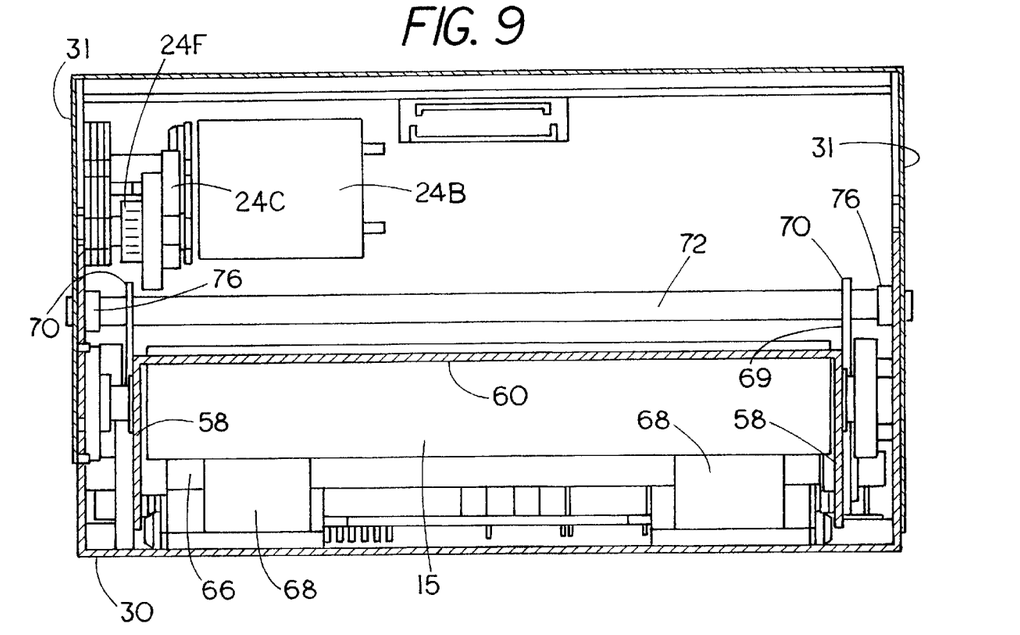
FIG. 9 is a sectional view taken generally along line 9—9 in FIG. 4.

As can be seen in FIGS. 7 and 9, which is an enlarged cross section view, the side arms or walls 58 of the platen support frame are to the side of triangular plates 69, which are pivoted on shaft 61 adjacent the housing side walls as well. There is a plate 69 on each side of the platen support 56. Plates 69 rotatably mount a cross shaft 66 on which a pair of cam rollers 68 are mounted. The cam rollers 68 are also shown in FIG. 9. The cam shaft 66 is driven by stepper motor 66A under control from controller 96 so the spring force can be changed by the cam. The platen roller stepper motor 15A is also controlled by controller 96. The cam rollers 68 can be set at a known position exerting a steady load on the carrier and thus between the circular object and the printhead or moved to change the load and position of the platen as a function of the position of the substrate.

Figure 10:
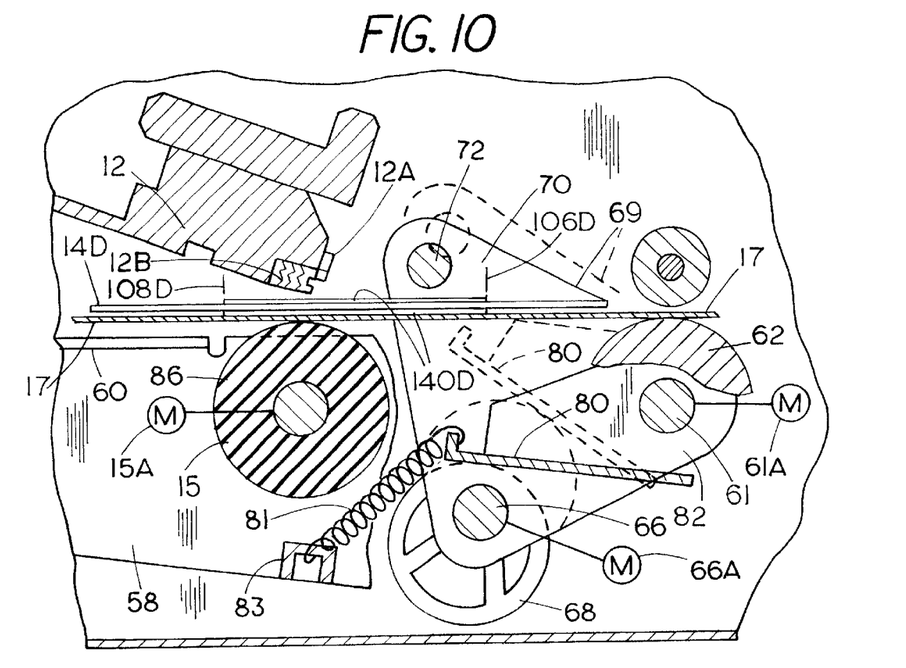
FIG. 10 is an enlarged view of a printing platen support with parts of a side wall of a platen frame broken away.

Upstanding ears 70 are part of plates 69 (See FIGS. 9 and 10) which are independent of the side arms 58, and these ears 70 hold a cross shaft 72 in position. The ends of the shaft 72 extend through slots 74 in the side walls 31 of the housing, so that there can be some movement of the shaft 72 to permit the printhead cartridge to be inserted into the housing and latched in place. Shaft 72 has bearing hubs 76 at its ends, again as shown in FIGS. 9 and 10, and the receptacles 42 on the printhead cartridge are of size to receive these hubs 76 as the printhead cartridge assembly 36 is inserted into place. The receptacles 42 are formed with a guide edge or a lead-in edge 42A that will slip under the hubs 76 and lift the shaft 72 so that the hubs 76 on the shaft 72 can slip into the receptacles 42, and detent in place in recesses 42B. The printhead cartridge is held from unwanted movement relative to the housing by providing any additional guides desired.

Figure 8:
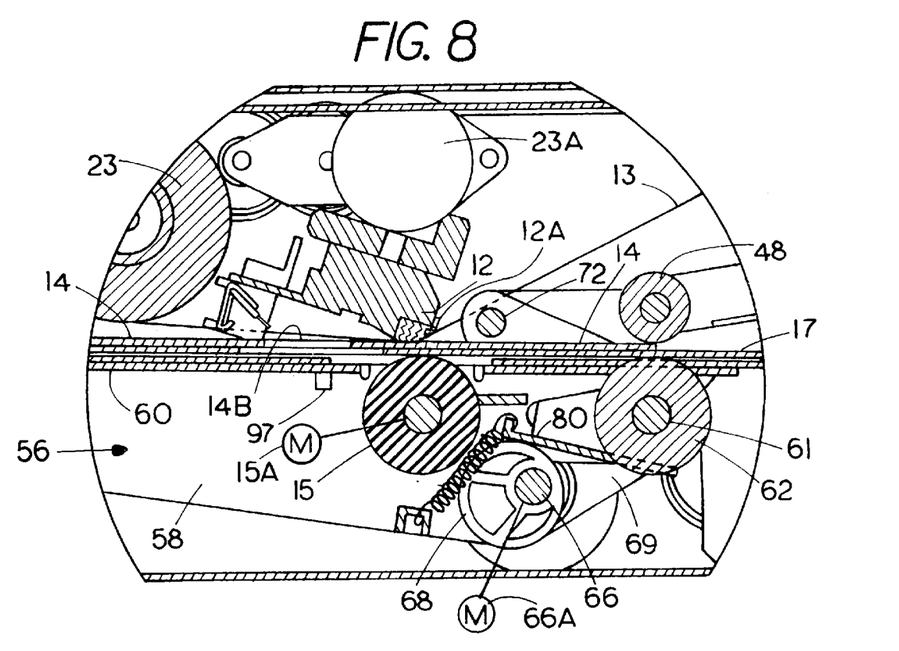
FIG. 8 is a sectional view similar to that shown in FIG. 7, with the printing about a third of the way through, where a maximum chordal length of the print area on the circular substrate is encountered near the center opening of a CD.

The cam rollers 68 act against a pivoting cam follower plate or movable control member 80 which has side arms 82 on opposite sides of the housing 30 pivoted on shaft 61 as well (see FIG. 10). The cam rollers 68 will change the position of plate 80. Springs 81 carried on the edge of plate 80 are used to apply a load to the platen roller 15 through a cross member 83 that mounts on walls 58 and on which end of springs 81 are hooked. The cam roller 68 can be set to provide a variable spring load on the platen as shown in FIGS. 8 and 9, and moved to drop the platen down for loading a disc or for permitting the printhead to clear a raised portion or irregularity on the disc or other substrate, as shown in FIGS. 6 and 10.

The platen roller 15 is driven by stepper motor 15A, the carrier 17 and the disc 14 are also driven by rollers 50 and 62 through the printing cycle, and under the printhead 12. The platen roller 15 has an outer resilient covering 86 as shown.

In FIG. 6, the substrate carrier 17 is shown in its loading (a lowered) position, having been driven outwardly by the drive rollers 50 and pinch roller 52 under control of a controller 96. The disc 14 can be put into the carrier and located against edge 19.

The drive roller 50 can then be driven by a suitable stepper motor 50A under control of central controller 96 to move the carrier and substrate or disc in the direction indicated by the arrow 54 and so that the leading end 14A of the disc 14, moves to the printhead. In this position, the disc is spaced below the printhead. A sensor 97 is used for sensing the position of the leading end or edge 14A of disc 14. After that, the controller 96 correlates the speed of movement and position of the carrier by counting steps of the stepper motors or by counting increments of rotation of a shaft. The disc or substrate is moved against the printhead by driving the stepper motor 66A and cam actuator 68, and actuator plate or control member 80 to move the arms 58 and platen 15 against the carrier and disc and urge the disc against the printhead at a selected force level.

While, for simplicity, this description has shown individual stepper motors for platen roller 15 and rollers 50 and 62, these rollers can be driven together with gears (or timing belts) using only one stepper motor, such as motor 15A or 61A. It is to be understood that varying the speed of platen roller 15 will also vary the speed of carrier drive rollers 50 and 62 the same amount. DC motors with suitable position feedback can be used.

The start of the printing cycle is shown in FIG. 7, where the leading end 14A of substrate or disc 14 is immediately under the printhead 12, which has the resistors forming heating elements 12B to provide print heat. As shown schematically in FIG. 11 the resistors 12B are inwardly positioned along the length of the print line and can be separately powered. Thus, for short print lines only selected resistors 12B are energized, reducing the overall power required. The platen roller 15 is urged up by springs 81 to provide a desired force to pivot platen support frame 56 and the platen roller 15 up against the support or carrier 17 as the carrier moves.

Figure 12:
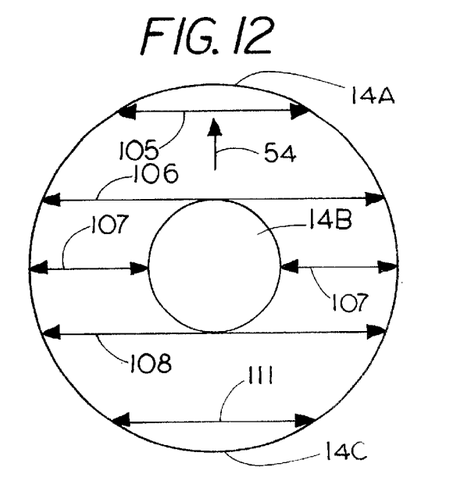
FIG. 12 is a plan view of a disc illustrating the different print line lengths across the disc at different disc positions.
Figure 12A:
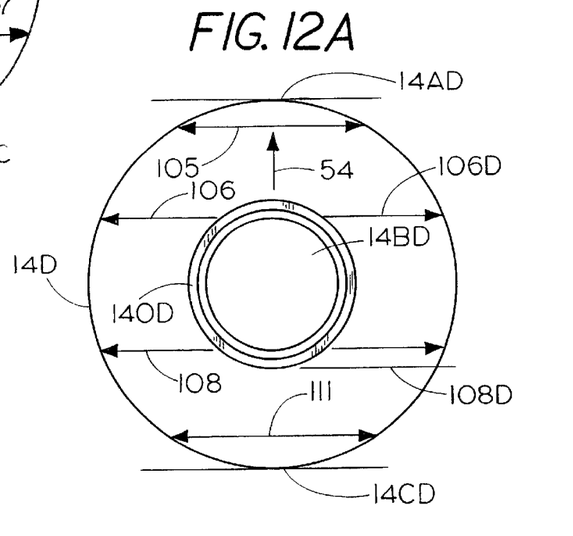
FIG. 12A is a plan view of a DVD showing the same print lines as in FIG. 12 on a DVD disc.

It should be noted that the substrate 14, when it comprises a CD, CD-R or DVD, has a hole 14B in the center portions (FIGS. 8 and 12). A DVD in addition as a circular raised rim around the hole, as is shown in FIG. 12A. The hole 14B causes the maximum length print line to be offset from the diameter on both the leading and trailing ends of the center hole 14B.

Figure 11:
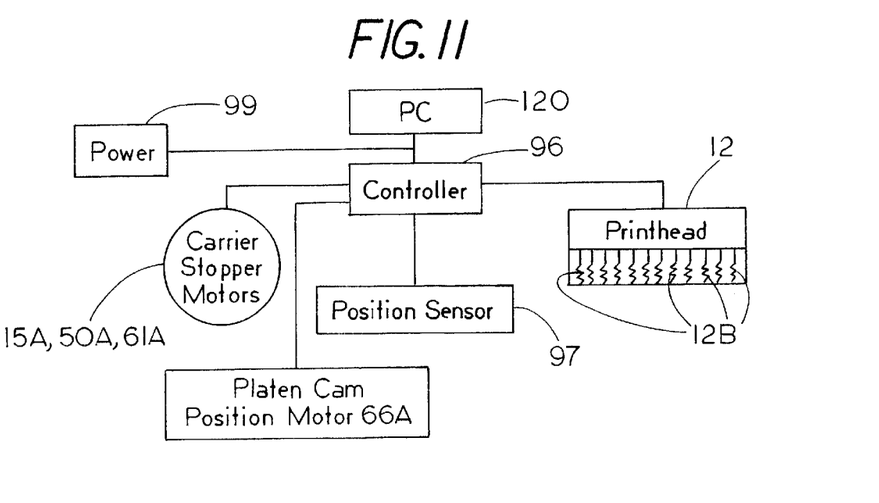
FIG. 11 is a schematic block diagram of a control for the present invention.

FIG. 11 shows the printer controller 96 that is programmed to control the stepper motor 15A as well as motors 50A and 61A that drive the carrier on which the disc or CD is placed. The controller 96 also individually controls the activation of resistors 12B on the printhead 12. The resistors generate heat to transfer color from a ribbon 13 to the disc 14. The length of the print line determines how many resistors or heaters are energized as the disc is moved. The position of the print line, for example, where the printing is on opposite sides of the center hole is also accommodated by energizing the appropriate heaters on resistors 12A. The printhead length is preferably at least as long as the diameter of the disc 14.

Once the controller knows when the carrier 17 is in a selected position, by the signal from sensor 97, the controller keeps track of the carrier's position relative to the known position by counting the number of steps the stepper motors take in one direction or the other. The disc position counts are then used to control the cam position motor 66A as well for controlling platen position and force against the printhead.

Power is needed to operate the stepper motors 15A, 50A and 61A and to activate the resistors 12B in the printhead 12 and is represented at block 99. The power needed by the stepper motors changes as the speed of the carrier 17 changes. The power needed to operate the printhead changes depending upon the number of resistors heated at any given time. The number of resistors that need to be heated for printing changes as the length of the print line changes. When printing on a circular disc 14, such as a CD, the length of the print line varies depending upon which part of the CD is being printed and depending upon whether the printhead is over the hole 14B in the center of the CD. Also, as will be explained, when printing a DVD, the platen will be lowered so the printhead clears a center rim and no printing will take place, so the power to the printhead is a minimum.

Thus, more power is needed to print on certain parts of a CD, DVD or CD-R than on others. The power drawn can be capped at the available limit and the time taken to print a CD, DVD or CD-R is minimized by increasing the speed of the carrier or tray when less power is needed to energize resistors 12A in the printhead. Controller 96 is programmed to vary the speed of motors 15A, 50A and/or 61A depending upon the location of the printhead 12 relative to chordal lines on the disc 14. The controller also varies the force on the platen to achieve adequate print quality, and to space the substrate from the printhead when desired.

Figure 13:
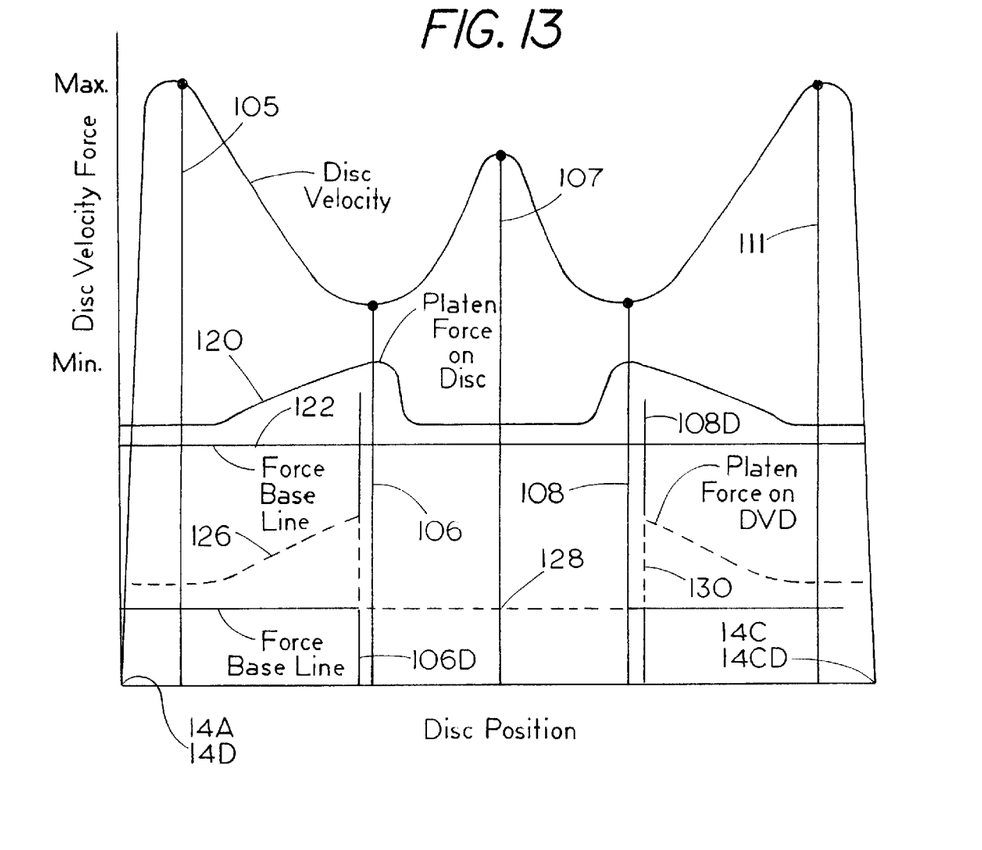
FIG. 13 is a plot of disc travel speed, platen force and platen position versus printhead position along a disc during printing.

FIG. 12 illustrates disc 14 comprising a CD or CD-R in plan view correlated with the plot of speed variations shown in the top plot in FIG. 13, to illustrate a typical speed variation when a label is printed on the entire printable surface of a disc or CD. Edge 14A is the leading edge of the disc 14 at which printing begins. Arrow 54 indicates the direction of movement of the disc relative to the printhead, which is perpendicular to the print line.

The speed of the carrier 17 and disc 14 for printing essential starts at zero when the carrier has been inserted and a print command is generated. The travel speed is brought up to a maximum close to leading edge 14A, for example at about line 105 on FIG. 12 and line 105 in FIG. 13. The power demand for energizing more resistors or heaters in the printhead to print a longer print line increases beyond the maximum power available to both heat the printhead resistors 12A and maintain the disc speed. The carrier drive motor or motors are slowed between about chordal lines 105 and 106 of FIG. 12, as shown at lines 105 and 106 in FIG. 13. The line 106 is the chordal line at which the largest number of printhead resistors 12A must be heated to print the print line. The speed of carrier 17 and disc 14 can increase between chordal lines 106 and the diametral line 107 because the hole 14B in the middle of the disc reduces the total length of the print line marking.

Even though there are print sections on opposite lateral sides of the hole, more power is available to the carrier 17 drive motors. The drive motor or motors must again slow between diametral line 107 and chordal line 108 (as represented in FIG. 13 as well) as the print line length increases and more power is required for the printhead resistors. Speed of travel of the disc can be increased from chordal line 108 to chordal line 111 as the print line again reduces in length to trailing edge 14C.

The disc will be at zero velocity at edge 14A and trailing edge 14C. Since acceleration of the drive motors for the drive rollers and platen is finite, the maximum velocity of the carrier and disc will be limited to some achievable value shown at points 105 and 111 on FIG. 13. The velocity of the carrier 17, and thus the velocity or speed of movement of the disc under the stationary printhead, is changing throughout the printing operation.

FIG. 12A is a representation of a DVD indicated at 14D. The position lines in FIG. 12A are the same as those illustrated in FIG. 12, and which are correlated to FIG. 13, but in this case, the DVD has an additional feature of a raised circular rim shown at 14DD located near the outside edge of the center opening 14BD. The leading edge 14AD is illustrated, and the trailing edge 14CD is illustrated as well.

When the leading end 14AD of the DVD is along line 105, it is handled in the same manner as that shown in relation to the velocity line in FIG. 13, which is the top plot. The controller 96, uses a combination of sensor input and distance of travel to keep track of the position of the carrier and the substrate, in this case the DVD. When controller 96, in accordance with its programming, recognizes that the carrier and DVD 14D have moved in the direction of arrow 54 to a position where the printhead is approaching or is just prior to touching the tangent line indicated at 106D, controller 96 activates platen cam position motor 66A to shift the cam thereby lowering the platen 15. The carrier, which had been urged by platen 15 out of its normal plane of movement (defined by the support from rollers 50 and 61) to engage the fixed position printhead and the DVD 14D is permitted to flex downwardly so that the rim 14DD clears the printhead.

A DVD is also shown in FIG. 10 with the platen 15 lowered. The line 106D is represented as a vertical line at the edge of the raised rib 14DD. The platen is lowered by moving cam 68 in response to the DVD position so the print head clears the rim. The platen is shown at a fully lowered position in FIG. 10, but it could be at an intermediate position.

The speed or velocity of movement can be increased over that shown in the top plot, to be substantially the same as the maximum velocity when the rim 14DD is passing under and is spaced from the printhead as shown in FIG. 10.

When the trailing end of the rim 14DD clears the printhead, such as shown on a tangent line 108D, the controller regulates the platen position cam motor 66A and cam 68 to move the platen 15 up into a raised position so that the printing would commence again and the drive would follow the same pattern of velocity as with a regular CD. In FIG. 10, the support drive roller 62 is shown schematically and drive rollers 62 and 50 will drive the support 17 even when the platen 15 is lowered so the DVD can move in its path spaced from the printhead. The heaters 12A can be deenergized when the substrate (DVD) is spaced from the printhead.

The feature of being able to drop the platen quickly by moving the cam 68, as driven by the motor 66A, can be used for any type of a substrate, that has a raised irregularity on the surface being printed. This could be a rectilinear identification card, or other type of card on which printing is to take place, and because the position of the card or disc can be sensed by suitable sensors, and by counting steps or rotational motion of the drive motors that are used for driving the carrier 17 and the substrate, the platen 15 can be dropped at any desired location, and then raised again. It is also apparent that the regulation of the position of the actuator plate 80 and through the springs 81 the position of the platen can result in a change in the force of the platen against the carrier, and thus the force that the substrate, such as the CD, DVD, or other substrate engages the printhead can be changed throughout the course of travel of the substrate under the printhead.

Referring to FIG. 13, a center plot 120 is shown schematically, and represents the force of the platen against a CD or CD-R urging it against the printhead at different positions relative to a zero force line 122. The force for printing on a smooth surface CD can be increased as the print line gets longer, and would then decrease in the center portions, where the hole is present as shown in a regular CD. It would then increase again at the position line 108, when velocity is being regulated on a regular CD, and would drop down as the trailing edge of the CD came underneath the printhead. This positioning can be done merely by driving the cam motor 66A and changing the position of a cam 68 that acts against the actuator plate 80.

In FIG. 10 where the DVD 14D is illustrated under the printhead 12, it can be seen that the cam 68 is lowered. It is shown in a maximum lowered position, but it could be in an intermediate lowered position. The printhead clears the rim or ring 14DD, as can be seen. The cam 68 changed the position of the platen to drop the platen so there was no contact between the printhead and the DVD when the leading edge of the rim or ring 14DD came just under the printhead. The cam will be operated to raise the platen and the DVD against the printhead when the trailing edge of the rim or ring 14DD has passed the printhead.

The plot 126 which is the lowest plot in FIG. 13 is to show the platen force, and position, when printing on a substrate such as a DVD that has a raised irregularity on the surface that is being printed. The plot 126 follows the force plot 120 initially, and at the line 106D that is represented, the platen drops down and the force on the DVD reduces to zero as shown in the plot section 128. Thus, the plot section 128 represents clearance between the DVD and the printhead as the rim or ring 14DD passes underneath the printhead. When the disc or substrate reaches the line 108D, the force will be increased again to match the curve of the force used on a regular CD during the rest of the printing.

By way of example, if a substrate that had an irregularity at one end, even though it may not be disc shaped, the force can be dropped as shown in the dotted line portion 130 of the plot 126 on FIG. 13.

The term disc position of course would be interpreted as substrate position, if a different substrate was being printed.

FIG. 13 shows in the top plot a graphical illustration of a typical variation in speed between the minimum and maximum speed of the tray as a label is printed on the entire printable surface of a planar circular substrate such as a CD. The variation is in an inverse ratio to the length of the print line, so as more heaters are required, the speed is reduced. The second plot illustrates variations in printing pressure that can occur when printing. The variation in speed and printing pressure can occur simultaneously or separately and can be done on any shape of substrate. The lower plot of FIG. 13 includes a variation when printing force goes to zero to provide clearance of a raised surface irregularity on a substrate, whether circular, or other shape.

If multi colors are to be printed, the carrier 17 and the substrate or disc 14 or 14D would be reversed in direction after the platen 15 is lowered as shown in FIG. 10 for clearance and another layer of color is printed over the same region, The substrate or disc is indexed appropriately using sensor 97. The signal from the sensor 97 will be used to coordinate the position of the disc 14 with the ribbon, film or web 13 and a particular color panel that is on that film, as well as providing the input for controlling the variable velocity of feed of the disc.

When printing is done, the substrate or disc 14 or 14D is removed after platen 15 is dropped and the carrier 17 is backed out. A new disc is put into the carrier 17 and the printing is repeated anew.

The controller 96 powered from a personal computer 120 will coordinate all functions, including the movement of the cam shaft 66 which loads the platen roller 15. The printing desired is preprogrammed into the controller.

Although the present invention has been described with reference to preferred embodiments, workers skilled in the art will recognize that changes may be made in form and detail without departing from the spirit and scope of the invention.

What is claimed is:

1. A printer for printing onto a substrate comprising a housing, a printhead mounted in said housing and secured in a reference position, a support for the substrate to be printed, the support being movable toward and away from the printhead, a variable position platen movable toward the support to move the support toward the printhead for holding a substrate on the support in printing contact with the printhead, a drive for said support to drive said support and a substrate thereon movable relative to said printhead, a controller for varying the position of the platen and support in correlation to the position of the substrate under the printhead to change force acting between the substrate and printhead.

2. The printer of claim 1, wherein the printhead is a thermal dye sublimation printhead having a thermal dye sublimation ribbon and having a plurality of heat elements for engaging the ribbon to transfer printing onto the substrate.

3. The printer of claim 1, wherein said drive is a variable speed drive and is varied as a function of print line length on the substrate.

4. The printer of claim 3, wherein said substrate is a circular object selected from one of a compact disc, a recordable compact disc and a digital versatile disc.

5. The printer of claim 1, wherein the controller changes the force acting between the substrate and printhead by adjusting the position of said support relative to the printhead, and the position of said support being adjustable to provide a zero force with clearance between the substrate and printhead in selected portions of the substrate.

6. The printer of claim 1, wherein the substrate has a raised surface portion, the controller varying the position of the platen and support so the substrate on the support clears the printhead in selected portions of the substrate.

7. The printer of claim 6, wherein the substrate comprises a digital versatile disc (DVD).

8. The printer of claim 7 and a controller to vary the speed of movement of the DVD relative to the printhead as a function of the length of print line printed on the disc.

9. A printer for printing on substrates comprising a housing, a printhead mounted in said housing and having a length and having a plurality of heater elements along a print line, a ribbon underlying the printhead, a platen movably mounted in said housing, an adjustable loading device for exerting a force to move the platen toward the printhead, a movable generally planar carrier for supporting a substrate and movable to a printing position with a substrate supported thereby operably engaging the ribbon and printhead for printing, a power drive to move the carrier relative to the printhead while the printhead prints on the object, and a controller for the loading device to control the position of the loading device and the platen relative to the printhead to vary the force of the carrier against the printhead as a function of the position of a substrate supported thereon relative to the printhead, the loading device being movable to space the platen from the carrier so the substrate clears the printhead in selected positions of the substrate.

10. The printer of claim 9, wherein the substrate is a circular object and the function of the position of a circular object supported on the carrier is a chordal line on the circular object that is under the printhead as the carrier moves relative to the printhead.

11. The printer of claim 10, wherein said printhead is a thermal printhead having heaters along a print line, and the movement of the carrier is substantially perpendicular to the print line, said controller controlling the heaters in the printer to energize only the heaters over portions of the circular a object on which printing is to occur as the carrier moves perpendicular to the print line.

12. The printer of claim 11, wherein the circular object has a center hole and an annular raised ring around the hole, and wherein the circular object is spaced from the printhead when the annular raised ring is aligned with the printhead.

13. The printer of claim 11, wherein the heaters of the thermal printhead are de-energized when the substrate is spaced from the printhead.

14. The thermal transfer printer of claim 10, wherein said controller controls the speed of movement of the carrier to a maximum as the circular object comes into registry with the printhead, and decreases the speed of movement of the carrier as the length of the print line on the circular object increases.

15. A thermal printer comprising a heated, controllable thermal printhead for printing along a print line, and a carrier for supporting a circular object to be printed in position urged against the printhead, a platen providing a variable force against the carrier to urge the carrier toward the printhead, a drive for driving the carrier to move in a path substantially perpendicular to the print line of the printhead, and a controller for varying the force transmitted by the platen against the carrier and the thermal printhead and for varying the speed of drive of the carrier as functions of a print line length used for printing.

16. The thermal printer of claim 15, wherein the carrier supports a circular object for engaging the printhead along chordal lines, and the controller controls the thermal printhead and energizes heaters to activate the thermal printhead only along the print line length to be printed on the circular object, such that as the power requirements for the printhead decrease, the drive for the carrier is provided with additional power for increasing the speed of such drive.

17. The thermal printer of claim 16, wherein said circular object is selected from one of a compact disc, a recordable compact disc, or a digital versatile disc made of a polycarbonate material.

18. The thermal printer of claim 15, wherein said printhead is a thermal dye sublimation printhead acting against a ribbon between the circular object and the printhead.

19. The thermal printer of claim 16, wherein the platen is movably mounted and moves to cause the carrier and the circular object supported thereon to be spaced from the printhead in selected center portions of the circular object.

20. A method of printing on a substrate having a raised portion on the surface on which printing takes place using a printhead and platen, comprising moving the substrate transversely to the printhead, determining a position of a leading edge of the raised portion, and separating the substrate and printhead when the leading edge is closely adjacent the printhead.

21. The method of claim 20 including determining a position of a trailing edge of the raised portion, and bringing the substrate into printing relationship with the printhead subsequent to passage of the raised portion past the printhead.

22. The method of claim 21, wherein separating the substrate and printhead and bringing the substrate into printing relationship with the printhead comprises moving the platen away from and toward the printhead as the substrate moves transversely to the printhead.

* * * * *